United States Patent [19]

Khanna et al.

[11] 4,417,032

[45] Nov. 22, 1983

[54] QUASI-RANDOM COPOLYMERS FROM HOMOPOLYMERS

[75] Inventors: Yash P. Khanna, Morristown; Edith A. Turi, Livingston; Shaul M. Aharoni, Morris Plains; Theodore Largman, Morristown, all of N.J.

[73] Assignee: Allied Corporation, Morris Township, Morris County, N.J.

[21] Appl. No.: 370,885

[22] Filed: Apr. 22, 1982

[51] Int. Cl.$^3$ ............................................. C08L 77/02
[52] U.S. Cl. .................................. 525/432; 524/147; 524/149; 524/153
[58] Field of Search .......................................... 525/432

[56] References Cited

U.S. PATENT DOCUMENTS

| | | | |
|---|---|---|---|
| 2,193,529 | 3/1940 | Coffman | 525/432 |
| 2,347,137 | 4/1945 | Salisbury | 525/432 |
| 2,996,474 | 8/1961 | Voigt | 525/432 |
| 3,509,107 | 4/1970 | Brignac | 260/78 |
| 3,536,780 | 10/1970 | Schaaf | 525/432 |
| 3,551,548 | 12/1970 | Brignac et al. | 264/234 |
| 3,995,084 | 11/1976 | Berger | 525/432 |

FOREIGN PATENT DOCUMENTS

| | | | |
|---|---|---|---|
| 646748 | 8/1962 | Canada | 525/432 |
| 569184 | 5/1945 | United Kingdom . | |

*Primary Examiner*—Paul Lieberman
*Attorney, Agent, or Firm*—Alan M. Doernberg; Kenneth E. Stroup; Gerhard H. Fuchs

[57] ABSTRACT

A process for preparing quasi-random copolymers is described which involves heating a mixture of polyamides in the presence of one or more phosphite promotor(s). The process is conducted at temperatures between about 265° C. and 315° C. with the process time generally ranging from about 2 to about 20 minutes. The process is especially useful for preparing copolymers from a mixture of poly(caproamide) and poly(hexamethylene adipamide). The copolymer products prepared in accordance with the process are particularly suitable for the production of plastic films which have improved properties as compared to either of the homopolymers.

10 Claims, No Drawings

QUASI-RANDOM COPOLYMERS FROM HOMOPOLYMERS

BACKGROUND OF THE INVENTION

This invention relates to a novel process for producing copolymers using homopolymers as the starting materials. More specifically, this novel process involves reacting a mixture of two or more polyamides, especially poly(caproamide) (nylon 6) and poly(hexamethylene adipamide) (nylon 6.6) and a phosphite promoter or a combination of phosphite promoters in order to obtain a copolymer from the reaction of the individual homopolymers. The materials obtained by this process are not strictly random or block copolymers but behave similarly to a random system and, therefore, we classify them as "quasi-random" copolymers. For simplicity, we shall refer to them as random copolymers. The random copolymers of the present invention may be fabricated into films or other products which have desirable properties, and can be useful in making injection molded or extruded products of improved properties.

U.S. Pat. No. 3,509,107 (Brignac, 1970) discloses a process for increasing the relative viscosity of polyamide fibers or copolyamides by incorporating a phosphorous or phosphite compound into the polyamide under an inert gas atmosphere. The primary object to Brignac is to provide a process for increasing the viscosity of polyamide yarn and cord which requires a minimum amount of inert gas. U.S. Pat. No. 3,551,548 (Brignac et al., 1970) describes various optimizing procedures for U.S. Pat. No. 3,509,107. The described patents are each directed only to a method of producing polyamide yarn with increased viscosity via incorporating a phosphorous or phosphite compound into the yarn, and then heating said yarn in the presence of inert gas.

British Pat. No. 569,184 discloses a method for producing a random copolymer from nylon 6 and nylon 6.6. The invention described therein teaches that heating a mixture of nylon 6 and nylon 6.6 results in interchange between various sections of the respective polymer molecules with the final product being a random copolymer of nylon 6 and nylon 6.6. In order to produce a random copolymer of nylon 6 and nylon 6.6, British Pat. No. 569,184 teaches that it is necessary to heat the mixture of homopolymers for periods of time up to 8 hours at 285° C. without any catalyst.

Copending, commonly assigned application Ser. Nos. 280,563, 280,564, and 337,800 were filed previously, but arose from a common research program with the present invention. They are discussed herein without admitting such applications or the inventions claimed therein as being prior art with respect to the invention of this application.

Application Ser. No. 280,564 (July 6, 1981) discloses a process for decreasing the melt index and increasing the viscosity of polyamide fibers via incorporating a phosphate compound into the polyamide and heating the polyamide until the desired changes in the melt index and viscosity occur. The phosphates utilized in application Ser. No. 280,564 include substituted aryl phosphates which satisfy certain Hammett sigma values.

Application Ser. No. 280,563 (July 6, 1981) teaches that polymers of caprolactam with increased viscosity may be produced by reacting in the melt a phosphite compound and a caprolactam polymer.

Application Ser. No. 337,800 discloses a process for preparing block and graft copolymers. The described process involves reacting two or more polyamides, polyesters, acid homopolymers of β-unsaturated carboxylic acids in order to form a graft and/or block copolymer. Included in the application are copolymers formed from poly(caproamide) and poly(hexamethylene adipamide).

BRIEF DESCRIPTION OF THE INVENTION

The present invention relates to a novel process for preparing random copolymers which comprises the following steps:

a. forming a mixture of poly(caproamide) and poly(hexamethylene adipamide) and a phosphite promoter or combinations of phosphite promoters wherein said phosphite promoters are represented by the formula:

with $R_1$ being alkyl, haloalkyl, phenyl or phenyl substituted with one or more substituents selected from the group consisting of alkyl, haloalkyl, cyano, nitro, alkylcarbonyl, or isocyanato with $R_2$ and $R_3$ being the same or different, and are individually hydrogen, a metal cation, ammonium radical or $R_1$;

b. heating said mixture at an elevated temperature for a period of time sufficient to produce a random copolymer having predominantly a single melting transition.

This invention introduces a new concept for the synthesis of random copolymers. Prior art teaches that the random copolymer of poly(caproamide) (nylon 6) and poly(hexamethylene adipamide) (nylon 6.6) can be synthesized by mixing the respective homopolymers and heating the mixture for long periods of time at 285° C. We have unexpectedly discovered that nylon 6 and nylon 6.6 homopolymers can be reacted relatively fast (2 to 20 minutes) to yield a random copolymer. Copolymers in general have superior properties over their respective homopolymers. However, copolymers are generally expensive to produce, as significant modifications in the polymerization process are often required. Based on the discovery of this invention, homopolymers can be easily copolymerized into random copolymers during the processing stage.

DETAILED DESCRIPTION OF THE INVENTION

In accordance with this invention, there is provided a novel process for producing random copolymers from two or more polyamides, especially the random copolymer of poly(caproamide) and poly(hexamethylene adipamide). The random copolymers of this invention may be processed into high quality plastic films having superior optical and strength properties with respect to those of the existing homopolymer films. Additionally, the random copolymers are useful for packaging materials, unreinforced and reinforced molding resins, fibers and products made from them, stampable sheets, fuel tanks, electric tool housings, general engineering plastics, injection molding compounds, etc.

Other combinations of polyamides which will likely be suitable for the process of this invention include poly(caproamide) in combination with an aliphatic or aromatic polyamide such as poly(lauryllactam) (nylon 12), poly(undecanoamide) (nylon 11) or poly(1,3-phenylene isophthalamide).

The process of this invention consists essentially of two primary steps. Initially, a blend of poly(caproamide), poly(hexamethylene adipamide) and one or more phosphite compounds is formed. Secondly, the blend is heated at an elevated temperature for a time sufficient to form a random copolymer evidenced by the formation of a polymeric material having a predominantly single melting transition or a polymeric material having a single melting transition. By the phrase "predominantly a single melting transition" is meant a single major melting transition having a minor shoulder.

The order of mixing of the components of the above-described blend is not particularly critical. In other words, the order of addition of the homopolymers and phosphite compound or phosphite compounds can be varied as desired.

Components of the blend can be granulated and mixed dry in a tumbler, Banbury mixer or other similar device. The components of the blend should be mixed until the blend is uniform or as homogeneous as possible. Then the blend is heated in an extruder until the polymeric components melt and react to form a random copolymer. The formation of a random copolymer is evidenced by a single melting point when the extruded polymeric material is analyzed by differential scanning calorimetry. It will be appreciated that the mixing and heating of the blend of homopolymers and phosphite promoter or phosphite promoters may be accomplished by other conventional methods.

The reaction temperature of the present invention can vary over a range between about 265° C. and 315° C. Preferably, the reaction temperature should be maintained between about 295° C. and about 305° C., and most preferably the process should be carried out at a temperature of about 300° C. It will be appreciated that this invention and further experiments in regard to this invention have been conducted on a small laboratory scale. Therefore, it should be appreciated that if the invention were conducted on a larger industrial scale that some heat loss might occur. Consequently, an industrial practice of the present invention would possibly require that the extrusion vessel be heated to a temperature greater than 300° C. in order to obtain a reaction temperature of 300° C.

One of the most unusual and most unexpected aspects of this invention is that the random copolymers are formed in a relatively short time. The reaction time can vary from about 2 to about 20 minutes. In a preferred embodiment of this invention the reaction time is only about 10 minutes or even less.

The process of this invention is preferably carried out in the absence of air, as for example, in the presence of an inert gas. However, the absence of air is not mandatory. The process can be carried out in a batchwise or discontinuous fashion in a sealed container. Also, the process can be carried out in a continuous fashion in a single processing zone in series, as for example, by use of an extruder or in a plurality of such reaction zones.

The process can be carried out over a wide range of pressures without adversely affecting the quality of the process. Therefore, the process can be conducted at sub-atmospheric, atmospheric or super-atmospheric pressures.

It is instructive to note that the process should be carried out under anhydrous conditions. Nevertheless, satisfactory results can be obtained even when about 0.2 weight percent water is present in the reaction mixture. In general, however, the less water present, the more preferred will be the conditions.

Phosphite compounds useful in the practice of this invention are those of the formula:

wherein $R_1$ is alkyl, haloalkyl, phenyl or phenyl substituted with one or more substituents selected from the group consisting of alkyl, haloalkyl, cyano, nitro, alkylcarbonyl, or isocyanato with $R_2$ and $R_3$ being the same or different and are individually hydrogen, a metal cation, ammonium radical or $R_1$. Examples of such compounds are aliphatic and haloaliphatic phosphite compounds such as those wherein $R_1$, $R_2$ and/or $R_3$ are the same or different and are t-butyl, n-butyl, isopropyl, trifluoromethyl, hexyl, 2-chloro-ethyl, 3-chlorobutyl, pentyl, ethyl, neopentyl, and the like. Aryl phosphite compounds are also useful in the practice of the process of this invention. Examples of such useful aryl phosphite compounds are those in which $R_1$, $R_2$ and/or $R_3$ are the same or different and are phenyl, or phenyl substituted with one or more alkyl groups, as for example, 3,5-di-tert-butyl phenyl, 4-tert butyl phenyl, 3-isopropyl phenyl, 2,4-dimethyl phenyl and the like; one or more halo groups, as for example, 4-chlorophenyl, 2,4-dibromophenyl, 4-fluorophenyl, 3,5-dichlorophenyl and the like; cyano, such as 4-cyano-phenyl; nitro, as for example, 2-nitro phenyl; alkylcarbonyl, as for example, 2-methylcarbonyl phenyl; aldehyde functions and the like. Sodium, potassium, zinc, lithium, calcium, barium, magnesium, aluminum, lanthanium and other metal salts, and/or ammonium cation salts of phosphite compounds in which $R_2$ and/or $R_3$ are any of the above aliphatic or aromatic residues are also useful. Phosphite compounds for use in the preferred embodiments of this invention are those in which $R_1$, $R_2$ and $R_3$ are n-butyl, phenyl, ethyl, and 3,5-di-t-butyl phenyl.

Another preferred embodiment of this invention is to use various combinations of the above-described compounds in varying amounts. It is especially preferred to use tri-n-butyl phosphite in combination with triphenyl phosphite to produce satisfactory results. It is preferred to use an excess of tri-n-butyl phosphite over triphenyl phosphite. It is even more preferred to use a ratio of tri-n-butyl phosphite to triphenyl phosphite of about 4 to 1.

It is possible to vary the weight percent of the phosphite in the reaction mixture over a range from about 0.1% to 6%. In the preferred embodiments of this invention the amount of phosphite utilized is between about 0.2% and about 4% with about 1% being the most preferred amount of phosphite or phosphites to be utilized for the practice of the present invention.

The physical blend of poly(caproamide), poly(hexamethylene adipamide), and phosphites described above produces a random copolymer when said blend is processed in accordance with the embodiments of this invention. The random copolymer results from the cleavage of poly(hexamethylene adipamide) into 1,6-diamino-hexane moieties [—NH—$(CH_2)_6$—NH—] and adipoyl moieties [—OC—$(CH_2)_4$—CO—] and the cleavage of poly(caproamide) into aminocaproyl moieties [—HN—(CH$_2$)$_5$—CO—] with the three moieties of the two homopolymers recombining in a somewhat random fashion to yield a random copolymer.

The melting point of pure poly(caproamide) is 222° C. and the melting point of pure poly(hexamethylene adipamide) is 261° C. The random copolymer of these materials has a single depressed melting point with respect to the homopolymers. For example, an 80/20 blend of nylon 6/nylon 6.6 yields a single melting point of 211° C. The depressed melting points are probably due to the defects in the crystals (lower crystallite size) of the major component caused by the minor component. Additionally, the copolymers have a lower heat of fusion than the respective homopolymers. This characteristic may be attributed to reduced crystallinity.

Random copolymers synthesized via the novel process of this invention have generally desirable tensile properties. Characteristically, the random copolymers have increased breaking elongation, increased breaking strength, decreased modulus, and decreased yield strength as determined by standard ASTM procedures with respect to the tensile properties of nylon 6 and nylon 6.6. The improved tensile properties of the random copolymers have a direct bearing on the quality of shaped objects that are produced from the random copolymers. In particular, films produced from the random copolymers are capable of absorbing more stress than films produced from homopolymers, and the films are somewhat more flexible than are films produced from homopolymers.

Films produced in accordance with this invention may be employed as packaging materials, incorporated in laminates and diffusion barriers, cooking bags, cable insulation and the like.

The foregoing detailed description of the invention has been given for clarity of understanding only, and no unnecessary limitations are to be understood therefrom. The invention is not limited to the exact details herein shown and described, and will encompass obvious modifications which will occur to those skilled in the art in view of the appended claims.

EXAMPLES

In Examples 1-7 the following general procedures were utilized for sample preparation and property characterization.

(A) Sample Preparation: Pellets of nylon 6 (8207 from Allied Corporation) and nylon 6.6 (Zytel 101L from DuPont) were mixed in four combinations of N6$_x$/N6.6$_{100-x}$; where x=80, 60, 40, and 20. The samples were dried overnight under vacuum at 120° C., sprayed with 1% triphenyl phosphite (TPP), and then extruded at about 280° C. A Wayne extruder with 4:1 screw and 1¼ inch (3.175 cm) diameter was employed. The extrudates were pelletized, dried overnight at 120° C. under vacuum, and then molded into films of about 0.1524 mm thickness after 10 minutes thermal treatment at 280° C. in the press. For reference purposes, pure nylon 6 and pure nylon 6.6 were also processed similarly, except that no promoter was added. Also, one sample of nylon 6.6 was processed in the presence of 1% TPP for reference purposes.

(B) Viscosity Measurements: The reduced viscosity (RV) of the films was measured at a concentration of 0.5% in m-cresol at 25° C. using a Cannon-Ubbelohde viscometer.

(C) Thermal Analysis: Differential scanning calorimetry (DSC) was used to obtain the thermal transitions. A DuPont 1090 thermal analyzer with a DSC cell in argon atmosphere was used. A sample of 12-13 mg was crimped in an Al pan and heated at 10° C./minute. After initial heat up, the samples were held at 280° C. for 5 minutes prior to either programmed cooling (10° C./min) or quenching in liquid nitrogen. A subsequent reheat was carried out under the same conditions as the initial heat up.

(D) Tensile Testing: Tensile property measurements were carried out at 23° C. and 50% R.H. on a model TTD Instron under the following conditions: 1.0" (2.54 cm)/minute head speed, 20" (50.8 cm)/minute chart speed, 1.0" (2.54 cm) gage length and ASTM-Type V specimen.

EXAMPLES 1-7

The melting behavior of the copolymers obtained by this new process is compared with the melting behavior of pure nylon 6 and pure nylon 6.6 in Table I.

As shown by the data in Table I, the addition of nylon 6.6 to nylon 6 or vice-versa (in the presence of a promoter) decreases the melting point of the major component. All the copolymer compositions except the 60/40 composition of nylon 6/nylon 6.6 are characterized by a single melting transition; the melting behavior of the latter is not understood at present. The lowest melting point of about 210° C. (eutectic effect) was obtained with an 80/20 composition of nylon 6/nylon 6.6. The copolymers also exhibited a lower heat of fusion ($\Delta H_f$) than either of the homopolymers.

The tensile properties of the copolymers obtained by this new process are compared with the tensile properties of the pure nylons in Table II.

The data in Table II shows that the percent breaking elongation (BE) and the breaking strength (BS) of the copolymers are higher than those of the homopolymers. Also the modulus of the copolymers is lower compared to either of the two nylons. Such a combination of properties, i.e., higher strength and flexibility, is certainly advantageous in many applications. The changes in tensile properties can be explained if the copolymers have somewhat reduced crystallinity. The latter is supported by their lower heat of fusion as indicated in Examples 1-6 in Table I. The data reported in Table II is an average of five measurements.

TABLE I*

| | MELTING BEHAVIOR OF NYLON FILMS | | | | | |
|---|---|---|---|---|---|---|
| EX-AMPLE | SAMPLE | | | INITIAL HEAT UP | | REHEAT |
| | N6 | N6.6 | RV | $T_m$, °C. | $T_m$, °C. | $\Delta H_f$, J/g |
| 1 | 100 | 0 | 1.96 | 222 | 220 | 58.1 |
| 2 | 80 | 20 | 2.58 | 211 | 210 | 45.9 |
| 3 | 60 | 40 | 2.83 | 220 + 238 | 215 + ? | 49.6 |
| 4 | 40 | 60 | 2.65 | 248 | 244 | 42.7 |
| 5 | 20 | 80 | 2.22 | 252 | 249 | 43.8 |
| 6 | 0 | 100 | 1.63 | 261 | 261 | 62.1 |

*Examples 1 and 6 were heated in the absence of a promoter.
Examples 2, 3, 4, and 5 were heated in the presence of 1% triphenyl phosphite.

TABLE I*-continued
MELTING BEHAVIOR OF NYLON FILMS

| EX-AMPLE | SAMPLE N6 | N6.6 | RV | INITIAL HEAT UP $T_m$, °C. | REHEAT $T_m$, °C. | $\Delta H_f$, J/g |
|---|---|---|---|---|---|---|

TABLE II*
TENSILE PROPERTIES OF NYLON FILMS

| EX-AMPLE | SAMPLE N6 | N6.6 | RV | (YS) MPa | (BS) MPa | (BE) % | (MOD) MPa |
|---|---|---|---|---|---|---|---|
| 1 | 100 | 0 | 1.96 | 32.6 | 73.5 | 340 | 1183 |
| 2 | 80 | 20 | 2.58 | 31.2 | 83.2 | 355 | 804 |
| 3 | 60 | 40 | 2.83 | 31.5 | 92.9 | 355 | 926 |
| 4 | 40 | 60 | 2.65 | 32.8 | 88.7 | 370 | 1016 |
| 5 | 20 | 80 | 2.22 | 34.0 | 92.0 | 375 | 1150 |
| 6 | 0 | 100 | 1.63 | 36.5 | 79.0 | 315 | 1465 |

*Examples 1 and 6 were heated in the absence of a promoter. Examples 2, 3, 4, and 5 were heated in the presence of 1% triphenyl phosphite.

It will be appreciated to note that phosphite promoter(s) increases the viscosities of the two pure nylons but does not cause any significant change either in the melting temperature or in the tensile properties. This is demonstrated, for instance, by a comparison of examples 6 (nylon 6.6—without promoter) and 7 (nylon 6.6—with 1% triphenyl phosphite) in Table III; the two samples were prepared and analyzed similarly except that the latter has 1.0% TPP promoter.

TABLE III
EFFECT OF PROMOTER(S) ON THE MELTING AND TENSILE PROPERTIES OF NYLON FILM

| EX. | SAMPLE PROMOTER | RV | MELTING TEMPERATURE INITIAL HEAT UP $T_m$, °C. | REHEAT $T_m$, °C. | TENSILE PROPERTIES YS MPa | BS MPa | BE % | MOD MPa |
|---|---|---|---|---|---|---|---|---|
| 6 | None | 1.63 | 261 | 261 | 36.5 | 79.0 | 315 | 1465 |
| 7 | 1.0% TPP | 2.50 | 259 | 259 | 37.4 | 78.3 | 315 | 1486 |

The results in Table III clearly show that the changes in the melting and tensile properties of nylon 6 upon the addition of nylon 6.6 or vice-versa (Tables I and II) must be due to copolymer formation rather than due to the addition of the promoter(s).

EXAMPLES 8–11

Using the procedure described for sample preparation above, "pellets" of nylon 6/nylon 6.6 (80:20) with and without phosphite promoter(s) were made by extrusion at about 300° C. Tri-n-butyl phosphite (TBP) was used instead of triphenyl phosphite (TPP), and Example 11 utilized a combination of TPP and TBP. The melting data of these "pellets" was characterized according to the thermal analysis procedure described above and is summarized in Table IV. The DSC results clearly indicate that the pellets containing promoter(s) formed a single major melting at about 213° C. followed by a shoulder at about 236° C. When reheated, these sampls exhibited a well-defined single melting point at 211° C. However, in the absence of any promoter, no single melting point was obtained.

Extrusion conditions similar to those described here, which produce pellets of almost single melting transition, are regarded as satisfactory since a reprocessing heat cycle results in a copolymer with a well-defined melting point.

TABLE IV*
MELTING BEHAVIOR OF NYLON 6/NYLON 6.6 (80:20) PELLETS

| EXAMPLE | SAMPLE PROMOTER | INITIAL HEAT UP $T_m$, °C. | REHEAT $T_m$, °C. |
|---|---|---|---|
| 8 | NONE | 220 + <u>257</u> | <u>214</u> + 242 |
| 9 | 1.0% TBP | <u>213</u> + 235 | <u>211</u> |
| 10 | 1.5% TBP | <u>213</u> + 236 | <u>211</u> |
| 11 | 0.2% TPP + 0.8% TBP | <u>214</u> + 236 | <u>211</u> |

*Major melting transitions are underlined in the above Table. Also, the reheat was carried out on the samples quenched after five minutes treatment at 300° C., following the initial heat up.

We claim:
1. A process for preparing random copolymers which comprises:
a. forming a mixture of poly(caproamide) and poly(hexamethylene adipamide) and a phosphite promoter or combinations of phosphite promoters wherein said phosphite promoters are represented by the formula:

with $R_1$ being alkyl, haloalkyl, phenyl or phenyl substituted with one or more substituents selected from the group consisting of alkyl, haloalkyl, cyano, nitro, alkylcarbonyl, or isocyanato with $R_2$ and $R_3$ being the same or different, and are individually hydrogen, a metal cation, ammonium radical or $R_1$;

b. heating said mixture at a temperature between about 265° C. and about 315° C. for a period of time between about 2 and about 20 minutes in order to thereby produce a random copolymer having predominantly a single melting transition.

2. A process according to claim 1 wherein said phosphite promoter or said combination of phosphite promoters is present in a weight percent amount between about 0.2% and 4%.

3. A process according to claim 1 or 2 wherein said phosphite promoter is tri-n-butyl phosphite.

4. A process according to claim 1 or 2 wherein said phosphite is triphenyl phosphite.

5. A process according to claim 1 or 2 wherein said combination of phosphites is comprised of tri-n-butyl phosphite and triphenyl phosphite.

6. A process according to claim 5 wherein tri-n-butyl phosphite and triphenyl phosphite are present in equal amounts.

7. A process according to claim 5 wherein said combination of phosphites is comprised of a ratio of about 4 to 1 of tri-n-butyl phosphite to triphenyl phosphite.

8. A process according to claim 2 wherein the heating step is conducted in two stages, the first of which is at a temperature between about 265° C. and about 315° C., and the second of which is at a temperature between about 240° C. and about 315° C.

9. A process according to claim 8 wherein said first and said second stages are conducted at temperatures between about 295° C. and about 305° C.

10. A process in accordance with claim 1 wherein said time is between about 2 and about 10 minutes.

* * * * *